(12) United States Patent
Sathish (10) Patent No.: US 8,010,669 B2
(45) Date of Patent: Aug. 30, 2011

(54) METHOD, APPARATUS AND COMPUTER PROGRAM PRODUCT FOR ENABLING DUAL MODE COMMUNICATION

(75) Inventor: Sailesh Kumar Sathish, Tampere (FI)

(73) Assignee: Nokia Corporation (FI)

( * ) Notice: Subject to any disclaimer, the term of this patent is extended or adjusted under 35 U.S.C. 154(b) by 301 days.

(21) Appl. No.: 12/251,971

(22) Filed: Oct. 15, 2008

(65) Prior Publication Data

US 2010/0094922 A1    Apr. 15, 2010

(51) Int. Cl.
G06F 15/16 (2006.01)
G06F 15/173 (2006.01)

(52) U.S. Cl. ........ 709/225; 709/217; 709/219; 709/223; 709/224

(58) Field of Classification Search ............. 709/217, 709/219, 223, 224; 707/102; 706/12
See application file for complete search history.

(56) References Cited

U.S. PATENT DOCUMENTS

| | | | |
|---|---|---|---|
| 2002/0083025 A1* | 6/2002 | Robarts et al. | 706/12 |
| 2008/0016182 A1* | 1/2008 | Sathish et al. | 709/219 |
| 2009/0327327 A1* | 12/2009 | Sathish | 707/102 |

FOREIGN PATENT DOCUMENTS

WO  WO 2008/007338 A2  1/2008

OTHER PUBLICATIONS

Andreas Brodt; Sailesh Sathish; "Together we are strong—Towards Ad-Hoc Smart Spaces"; Pervasive Computing and Communications, 2009; PerCom 2009; IEEE International Conference on Mar. 9, 2009; IEEE; Piscataway, NJ, USA; 4 sheets.
International Search Report and Written Opinion for International PCT Application No. PCT/IB2009/007140; mailed Jan. 19, 2010.
Delivery Context: Client Interfaces (DCC1) 1.0, Accessing Static and Dynamic Delivery Context Properties, W3C Candidate Recommendation Dec. 21, 2007, available at http://www.w3.org/TR/DPF/, dated Sep. 29, 2008, 39 pages.
Sathish, S., Position Paper for Workshop on Declarative Models of Distributed Web Applications, available at http://www.w3.org/2007/02/dmdwa-ws/, 4 pages.

* cited by examiner

Primary Examiner — Quang N. Nguyen
(74) Attorney, Agent, or Firm — Alston & Bird LLP (57) ABSTRACT

An apparatus for enabling dual mode communication may include a processor. The processor may be configured to receive property information from a provider node, provide the property information to a delivery context client interface based context model, and enable access, by a consumer application, to the property via the delivery context client interface based context model to enable provision of consumer data to the property to enable adaptive or customized services to the consumer application via the property. A corresponding method and computer program product are also provided.

16 Claims, 4 Drawing Sheets

METHOD, APPARATUS AND COMPUTER PROGRAM PRODUCT FOR ENABLING DUAL MODE COMMUNICATION

TECHNOLOGICAL FIELD

Embodiments of the present invention relate generally to communication interface technology and, more particularly, relate to a method, apparatus, and computer program product for enabling dual mode communication, for example, via delivery context client interface (DCCI) models.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, it may be desirable for an application (e.g., a web based application) to have the ability to access information or objects from a device providing information to the application. For example, context data including device data related to capabilities, current operating state and/or other device data that may be static and/or dynamic may be useful information for the application to access. In this regard, context data may be associated with content stored on a device in order to provide information which might assist in identifying data of interest. Context data is data that characterizes a particular situation at any point in time and may be either static or dynamic. Metadata is another form of information which may be associated with content to assist in ordering and identifying the content. Metadata may be considered to be data that provides additional data about data and is generally thought of as being static. When media content is recorded or an application inquires about situational characteristics related to an object, the context data associated with the content or object may be referenced. The context data may be used by applications for different purposes, such as generating metadata or performing an adaptation based on the context. When used for adaptation purposes, no context is typically stored, but is instead used dynamically.

Delivery Context Client Interface (DCCI) is a mechanism through which applications can access device data such as delivery context information using, for example, a Document Object Model (DOM) like interface. As such, DCCI may act as a consumer interface for web applications (consumers) and providers of data to a tree-like interface. Providers of data can be any static or dynamic sources providing information such as device location, device orientation, screen brightness, battery strength, and many others.

Although DCCI may be useful in providing information to applications about device status, DCCI may currently only be considered a consumer interface. As such, applications (e.g., consumers) may typically only read data that is provided by providers, and thus the applications themselves do not provide information to the information providers. In other words, DCCI is typically characterized by a one-way flow of information from devices acting as information providers to the web applications acting as consumers. Additionally, DCCI currently uses a fixed set of interfaces and thus, may not support remote properties, but only in-device properties.

Accordingly, it may be desirable to provide a framework for overcoming at least some of the disadvantages discussed above.

BRIEF SUMMARY

A method, apparatus and computer program product are therefore provided for enabling dual mode communication. In this regard, a method, apparatus and computer program product are provided that may enable an extension of the interfaces available for various properties. As such, for example, embodiments of the present invention may provide a model via which properties can extend the standard DCCI set of interfaces through a standardized application programming interface (API) set. Accordingly, for example, both in-device and remote properties may be supported.

In one exemplary embodiment, a method of enabling a dual mode communication interface is provided. The method may include receiving property information from a provider node, providing the property information to a delivery context client interface (DCCI) based context model, and enabling access, by a consumer application, to the property via the DCCI based context model to enable possible provision of consumer data to the property to enable adaptive or customized services to the consumer application via the property.

In another exemplary embodiment, a computer program product for enabling a dual mode communication interface is provided. The computer program product includes at least one computer-readable storage medium having computer-executable program code instructions stored therein. The computer-executable program code instructions may include program code instructions for receiving property information from a provider node, providing the property information to a DCCI based context model, and enabling access, by a consumer application, to the property via the DCCI based context model to enable possible provision of consumer data to the property to enable adaptive or customized services to the consumer application via the property.

In another exemplary embodiment, an apparatus for enabling a dual mode communication interface is provided. The apparatus may include a processor. The processor may be configured to receive property information from a provider node, provide the property information to a DCCI based context model, and enable access, by a consumer application, to the property via the DCCI based context model to enable possible provision of consumer data to the property to enable adaptive or customized services to the consumer application via the property.

In another exemplary embodiment, an apparatus for enabling a dual mode communication interface is provided. The apparatus includes means for receiving property information from a provider node, means for providing the property information to a DCCI based context model, and means for enabling access, by a consumer application, to the property via the DCCI based context model to enable possible provision of adaptive or customized services to the consumer application via the property.

Embodiments of the invention may provide a method, apparatus and computer program product for employment in web based, or other network based operating environment. As a result, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention may be employed to, for example, provide an expanded set of properties (e.g., both remote properties and in-device properties) that may be supported by a set of standard interfaces. Accordingly, communication may be provided to enable consumers or applications to request certain services such as property initializations, expected data formats, granularity of data, data abstractions, service invocations, and/or the like.

Figure 1:
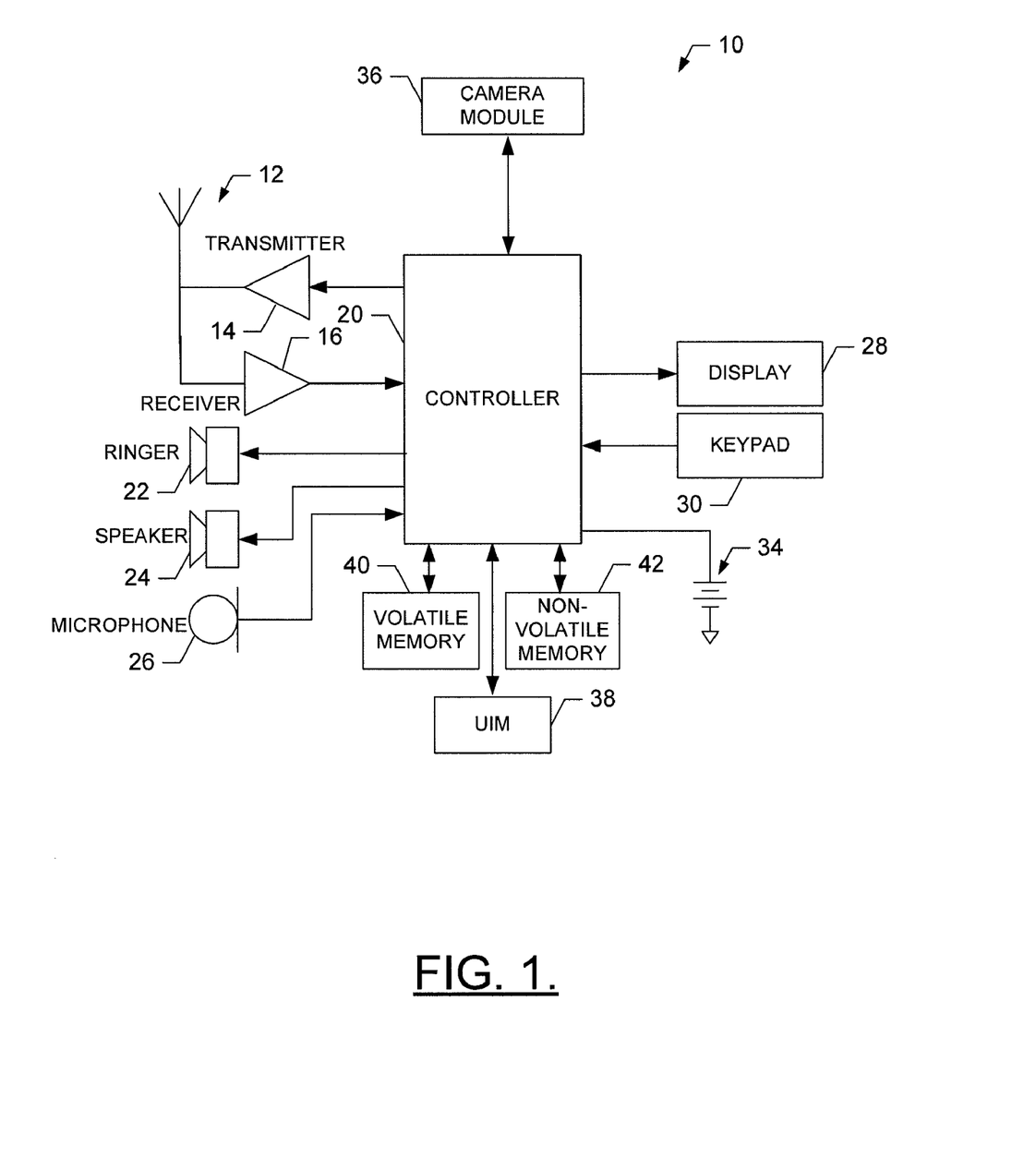
FIG. 1 is a schematic block diagram of a mobile terminal according to an exemplary embodiment of the present invention.

FIG. 1, one exemplary embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

Although not required, in some embodiments, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

An exemplary embodiment of the invention will now be described with reference to FIG. 2, in which certain elements of an apparatus for enabling the provision of a dual mode communication interface are displayed. The apparatus of FIG. 2 may be employed, for example, on the mobile terminal 10 of FIG. 1. However, it should be noted that the apparatus of FIG. 2, may also be employed on a variety of other devices, both mobile and fixed (e.g., computers or servers), and therefore, the present invention should not be limited to application on devices such as the mobile terminal 10 of FIG. 1. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Figure 2:
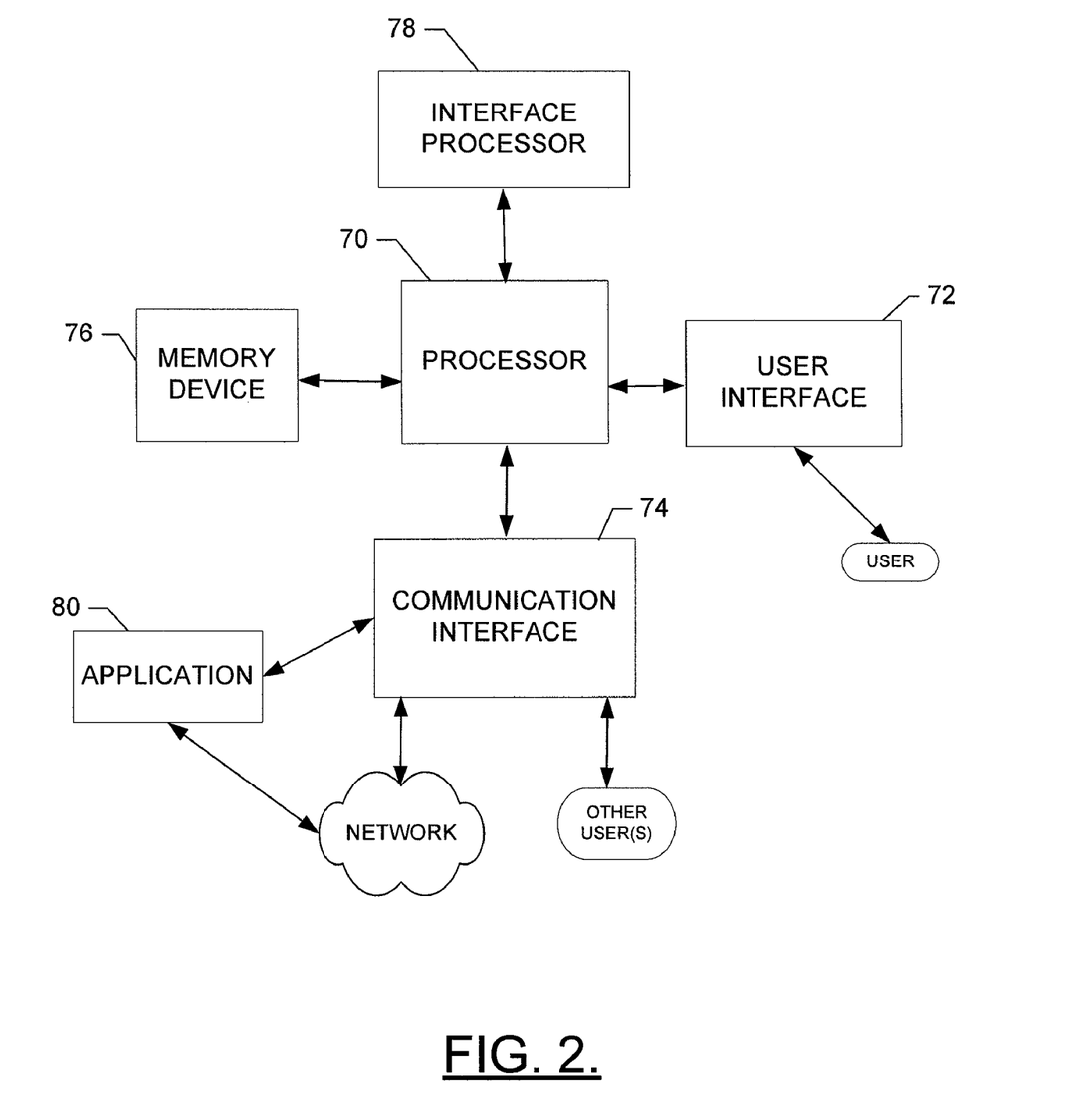
FIG. 2 is a schematic block diagram of an apparatus for providing dual mode communication according to an exemplary embodiment of the present invention.

Referring now to FIG. 2, an apparatus for enabling the provision of a dual mode communication interface is provided. The apparatus may include or otherwise be in communication with a processor 70, a user interface 72, a communication interface 74 and a memory device 76. The memory device 76 may include, for example, volatile and/or non-volatile memory (e.g., volatile memory 40 and/or non-volatile memory 42). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), a FPGA (field programmable gate array), a hardware accelerator, and/or the like. The processor 70 may be configured to execute instructions stored in the memory device 76 or otherwise accessible to the processor 70.

Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a touch screen display, a conventional display, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal (e.g., the mobile terminal 10), the user interface 72 may include, among other devices or elements, any or all of the speaker 24, the microphone 26, the display 28, and the keyboard 30.

In an exemplary embodiment, the processor 70 may be embodied as, include or otherwise control an interface processor 78. In some embodiments, the interface processor 78 may be in communication with one or more applications (e.g., application 80) that may act as consumers with respect to device context information provided (e.g., via DCCI) by the interface processor 78. Application 80 may be a web application or some other network application for which information about properties associated with the apparatus of FIG. 2 may be useful. As such, in some cases, the application 80 may be in communication with the interface processor 78 via the communication interface 74 (and/or via the processor 70).

The interface processor 78 may be any means such as a device or circuitry embodied in hardware, software or a combination of hardware and software that is configured to perform the corresponding functions of the interface processor 78 as described below. The interface processor 78 may be configured to process property extensions for local and/or remote properties as described herein. In some cases, the interface processor 78 may further be configured to define property changes. The definition of property changes may include defining additional properties and/or processing additional properties defined by other nodes. Defining property changes may also encompass defining new types of properties or defining value changes for new or existing properties or other topology changes such as removal of properties. The interface processor 78 may therefore be configured to enable dual mode communication between provider nodes (e.g., sources or in-device and/or remote properties) and consumer applications. In this regard, for example, contrary to prior DCCI communications which were essentially unidirectional in that consumers read context information from providers, the interface processor 78 of embodiments of the present invention enables the provision of adaptive services and/or customized services by providing a mechanism by which consumers may provide information to providers. The information provided to a provider may then be used by the provider to provide an adaptive service and/or customized service to the consumer.

In an exemplary embodiment, the interface processor 78 may be implemented at the mobile terminal 10. However, the interface processor 78 may also or alternatively be implemented at any of a number of other devices, both mobile and fixed, and thus is not limited to implementation at a mobile terminal. By employing embodiments of the present invention, a user may utilize the mobile terminal 10 to provide adaptive and/or customized services with respect to external devices via the DCCI interfaces. For example, a user may walk into a room and the browser application of the user's mobile terminal, which may be playing a particular song on its media player, and the web browser may communicate with an application controlling lighting in the room in order to dim the lights based on the mood of the particular song. As such, unlike standard DCCI interfaces, which essentially supported proactive nodes that push data into the DCCI model, embodiments of the present invention may further support reactive nodes that process an input in order to deliver an output based on the input. Thus, as another example, a provider node (e.g., a printer) may expose a current value of "active" or "not-active". The printer may additionally provide an interface allowing an application (e.g., a consumer) to set print parameters such as blackness level, mode of printing and/or the like. If the consumer uses the interface, the consumer may be requesting a customized service (e.g., in relation to print parameter options). As another example, a location based application may request the provision of location data from a location provider under a particular circumstance or set of circumstances (e.g., when the user has moved at least 10 meters, every 5 seconds, every time the user moves, etc.). The request may translate how the location property is initialized (e.g., based on a spatial parameter (e.g., every 10 meters) or a temporal parameter (e.g., every 5 seconds).

As can be seen from the examples above, the interface processor 78, by virtue of enabling dual mode communication between providers and consumers, may enable the provision of adaptive and/or customized services to accommodate reactive and proactive nodes. The ability to provide such adaptive and/or customized services may at least in part be attributed to the fact that the interface processor 78 supports both in-device properties and remote properties. In-device properties may include such properties as battery life, calendar information, network signal strength, information from local widgets or programs and/or numerous other proactive and reactive nodes. Remote properties may be properties related to other devices and/or services that may be accessible or available to the device hosting the interface processor 78 (e.g., the mobile terminal 10). For example, in a smart space in which other devices or services in the smart space may be accessible to the mobile terminal 10, properties related to one or more of the remote devices or services accessible to the mobile terminal 10 may be considered remote properties.

When used for defining additional extensions with respect to properties of standard DCCI interfaces, the interface processor 78 may utilize the DCCI field "propertyType", which may be defined as a DOMString. In other words, the propertyType field may identify the corresponding property identified by the interface. As such, in general terms, the interface processor 78 may be configured to enable the provision of additional extensions for corresponding additional properties supported using a property identification field (e.g., the propertyType field). In an exemplary embodiment, the property identification field may include a name of the property followed by a "." and a string of namespaces for extensions. Thus, as an example, a GPS property may have a property identification field of "GPS.ext.nokia.com" indicating to any calling application (e.g., application 80) that the property "GPS" in a DCCI tree has a proprietary interface extension that can be resolved within the "ext.nokia.com" namespace. Thus, the interface processor 78 may enable the definition of additional properties for which device information may be provided via DCCI.

For DCCI properties that host the property identification field (e.g., the propertyType field) with an extension, there may be an additional method called. The method may have any method name desirable such as, for example, "submitExtensionCall(DOMString methodName, type any parameterList)". As such, the metadata interface of such properties may expose an additional interface called "extensions" that may host a set of method structures. Each structure may be identified by a method name followed by a parameter name and type or class of parameter. As such, the interface processor 78 may provide support for additional methods and/or calls for use in connection with adaptive and/or customized service provision. Thus, for example, the interface processor 78 may be used to determine whether a particular call is to be sent to a local node or remote node.

In an exemplary embodiment, the interface may be defined as follows:

```
Interface extension{
Struct methodName{
DOMString parameterName: DOMString parameterType;
...
}
...
}.
```

In an exemplary embodiment, nodes such as consumers or applications (e.g., application 80) may be made aware of the addition of new properties, new types of properties and/or value changes to new or existing properties in a number of different ways. In some cases, the interface processor 78 may be further configured to generate an event notification (e.g., a "property added" notification) to indicate that a new property has been added. Notably, in the context used herein, the word "new" should be understood to mean most recent or currently added with respect to the entity adding the property, and not necessarily newness relative to the name or identity of the new property having not been used previously in connection with other nodes. As such, for example, the same property name may be provided in connection with different nodes and/or different namespaces.

The event notification may include an identification of the new property added (or identification of a property changed) by a target node firing or initiating the event notification (e.g., the node associated with the interface processor 78). In some instances applications or consumers may subscribe to a particular service in order to receive the event notification. In this regard, for example, an application (e.g., application 80) may subscribe to receive event notifications by adding an event listener at any node (including, in this instance, at the node associated with the interface processor 78). In some embodiments, an application may provide an event listener at a root node in order to receive all notifications associated with the corresponding root node including new properties added, new types of properties, value changes for new or existing properties and/or other topology changes such as removal of a property. When the event notification is fired or generated, the corresponding event may captured by the event listener to indicate that the new (or changed) property associated with the corresponding event is available.

Property activation may be accomplished in different ways as well. As an example according to a first exemplary embodiment, when an event notification is generated by the interface processor 78, the event notification may be indicative of an already active property that can be directly used by the consumer. In an alternative embodiment, the event notification may simply signal availability of the corresponding property, but not necessarily that the corresponding property is active. In such a situation, when the consumer adds a new event listener (e.g., for changes such as value changes to the corresponding property) at the node corresponding to the property, the provider (e.g., the node) may start sourcing data regarding its object representation. As such, properties may only start sourcing information if there is a consumer that actually requests such information (e.g., as indicated by the consumer adding a new event listener at the node corresponding to the property). Notably, the new event listener may be a different event listener from that described above in relation to listening for the event notification. In this regard, the new event listener may be a listener that only listens for value changed events.

Figure 3:
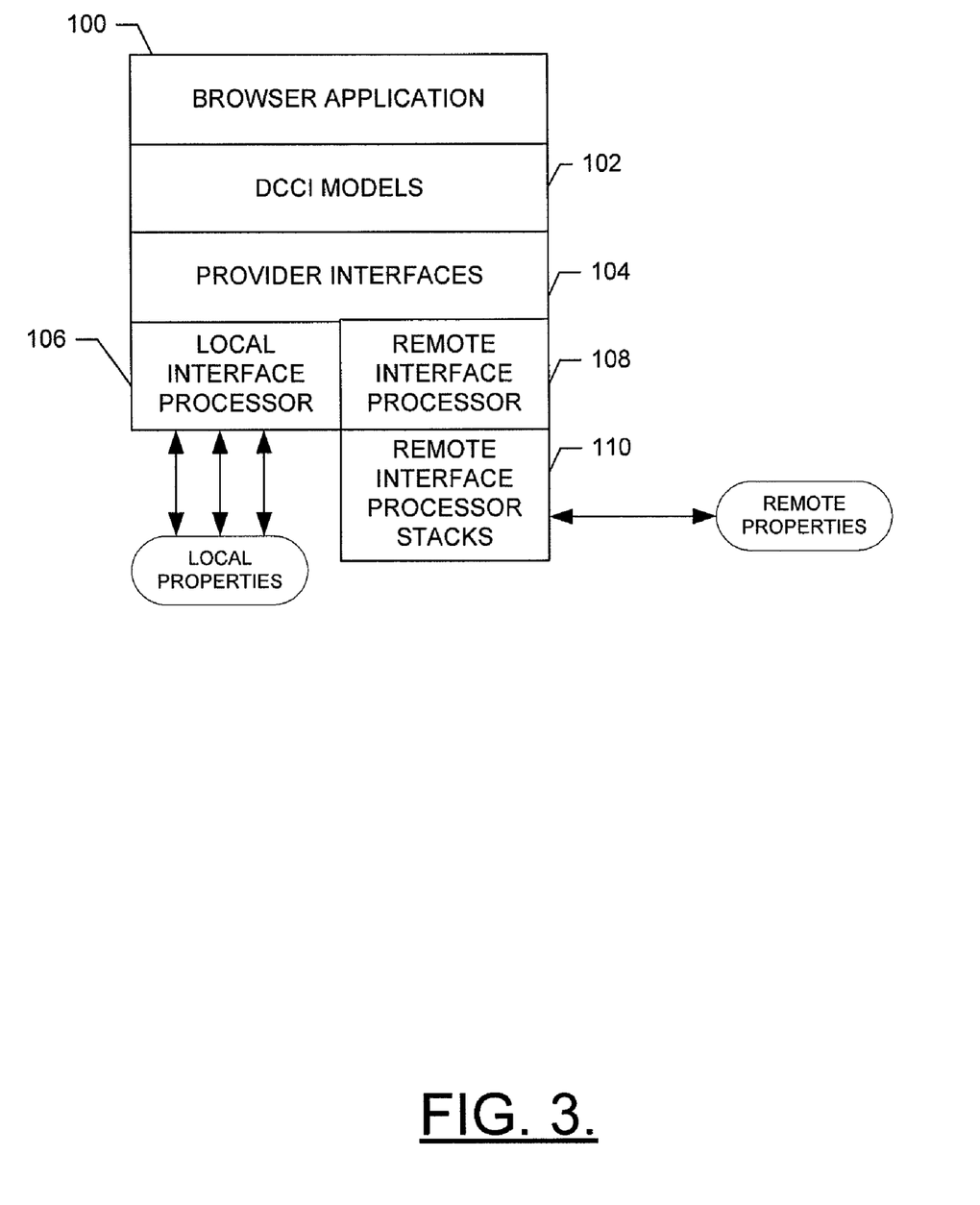
FIG. 3 illustrates an example of a framework for processing extensions to a DCCI model according to an exemplary embodiment of the present invention.

FIG. 3 illustrates an example of a framework for processing extensions to a DCCI model according to an exemplary embodiment. In this regard, as shown in FIG. 3, a browser application 100 of the mobile terminal 10 may interface with provider interfaces 104 via a DCCI model 102. Both the DCCI model 102 and the provider interfaces 104 may be extensions to the browser application 100. The provider interfaces 104 may receive information associated with properties available from local and remote sources via respective ones of a local interface processor 106 and a remote interface processor 108. The local interface processor 106 and the remote interface processor 108 may be respective portions of the interface processor 78. As such, each of the local interface processor 106 and the remote interface processor 108 may be any means such as a device or circuitry embodied in hardware, software or a combination of hardware and software that is configured to perform the corresponding functions of the local interface processor 106 and the remote interface processor 108, respectively, as described herein.

With respect to local properties, each local property may use the provider interface 104 to get an entry within the DCCI tree of the DCCI model 102. The entry may be determined based on security and ontology properties. Local properties may be invoked directly via the local interface processor 106 via the provider interface 104. When a new property is added, the property may call a method (e.g., an "addExtensions" method) of the provider interface 104 that may pass a list of method names and an associated parameter list. The provider interface 104 may convert these method names and the parameter list into an appropriate metadata structure and also create an instance for the property within the DCCI tree adding the new property identification (e.g., propertyType) that is provided by the provider. The consumer application (e.g., application 80) may look up the metadata structure to learn the method names and parameter list. The consumer application may then call the new DCCI method (e.g., "submitExtensionCall( )") passing the method name and the parameter list. The provider interface 104, via the call, may then convert the data passed into a DOMString serialization and pass the DOMString serialization to the local interface processor 106. The local interface processor 106 may maintain an internal lookup table (e.g., in the memory device 76) regarding property invocation and method lists. The local interface processor 106 may convert the received DOMString from the provider interface 104 to find an appropriate provider and method call. The method call may then be made dynamically through direct invocation or through another mechanism such as serializing the same DOMString over D-Bus communication stream to the provider. In this regard, the D-Bus may be an example of a device inter-process communication channel used to send information between applications. As such, method calls made over the D-Bus may be serialized as a message addressed to a particular application. The particular application may then listen and perform the service requested and place an output back on the D-Bus addressed to the browser application 100.

With respect to remote properties, the operation of the remote interface processor 108 may be similar to that described above in relation to the local interface processor 106. However, in some cases, additional stacks 110 may be supported by remote properties. Thus, for example, converting the DOMString from a remote provider to protocol specific entries may be handled by the stacks 110. In any case, processed output from the providers may be exposed back via a "value" interface of DCCI.

Accordingly, in embodiments of the present invention, a device or service may provide an input in the form of property information (e.g., application state information, initialization values, settings information, requests for information, and/or the like) to a consumer and the provider may provide adaptive services and/or customized services to the consumer based on the property information. In this regard, adaptive services may include services provided in dependence upon current context for which the services provided are adapted to user/device current context. Customized services may include services that are properly customized and not necessarily adapted according to provided parameters such as user context. As such, in some cases, customized services may include the supplying of initialization parameters instead of context data. The provision of the information above may be handled by the interface processor 78. Some embodiments may further provide for the creation of new extensions to extend the set of interfaces available to support both in-device (or local) and remote properties via the interface processor 78. Moreover, in some embodiments, the interface processor 78 may be further configured to generate an event notification to provide an indication that a new property is either active or available for activation by a consumer. Accordingly, embodiments of the present invention may provide for dual mode communication between consumers and providers with respect to DCCI so that an application doesn't need particular protocols in order to communicate with remote devices, but instead may communicate with such devices via an extension to standard API interfaces provided as described above.

Figure 4:
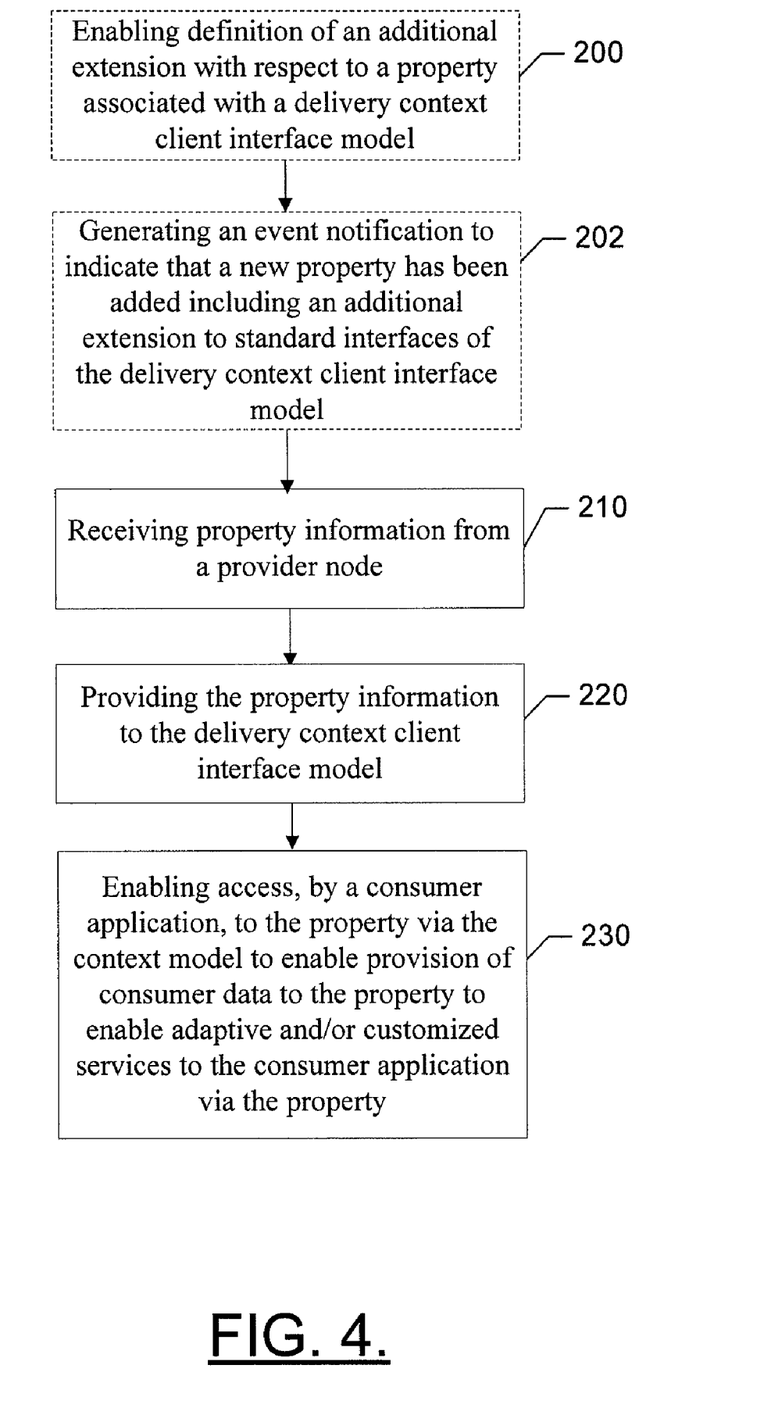
FIG. 4 is a block diagram according to an exemplary method for enabling dual mode communication according to an exemplary embodiment of the present invention.

FIG. 4 is a flowchart of a method and program product according to exemplary embodiments of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, a method according to one embodiment of the invention, as shown in FIG. 4, may include receiving property information from a provider node at operation 210. The received property information may be new property information, information about a new type of property, a value change to a new or existing property or another topology change. The method may further include providing the property information to a context model (e.g., a delivery context client interface model) at operation 220. The provision of the property information to the context model may be accomplished by the new property calling a provider interface function to add an extension. As a result of the call, the provider interface may create required metadata structures (e.g., method and parameters for the new property) and create an instance of the new property, for example, with the name of the property followed by a domain name. The method may further include enabling access, by a consumer application, to the property via the context model to enable the possible provision of consumer data to the property to enable services (e.g., adaptive services and/or customized services) to the consumer application via the property at operation 230. Operation 230 may include enabling the consumer application to lookup the property metadata structures and call the method relevant to the new property with its associated parameter list. On receipt of the call, the provider interface may perform its respective functions to provide the consumer application with the output of the method. The provider node may be, for example, an application or device (e.g., a user interface or other device) that may be local or remote with respect to a device practicing the method (e.g., the mobile terminal 10). In the context used herein, the term local may be understood to relate to situations where the consumer and provider are on the same device, while the term remote relates to situations where the consumer and provider are on different devices.

In an exemplary embodiment, the method may include further optional operations as well, examples of which are shown in FIG. 4 in dashed lines. Of note, any or all of the optional operations of FIG. 4 may be included in various combinations. Additionally, the ordering of the optional events need not necessarily be as provided in the example of FIG. 4. In an exemplary embodiment, the method may further include enabling definition of an additional extension with respect to a property associated with the delivery context client interface model at operation 200. The method may further include generating an event notification to indicate that a new property has been added including an additional extension to standard interfaces of the delivery context client interface model at operation 202.

In some embodiments, certain ones of the operations above may be modified or further amplified as described below. It should be appreciated that each of the modifications or amplifications below may be included with the operations above either alone or in combination with any others among the features described herein. In this regard, for example, enabling definition of the additional extension may include enabling provision of the additional extension for a corresponding additional property identified using a property identification field or providing a corresponding method identified by a method name, a parameter and an indication of a class of the parameter. As another example, generating the event notification may include providing the event notification to the application in response to the application subscribing to receive event notifications from the provider node. In some cases, in response to a listener detecting the event notification, an active property added may be activated or an available property added may be activated, if it had not yet previously been activated. In some embodiments, the provision of properties may include the provision of local properties or remote properties.

In an exemplary embodiment, an apparatus for performing the method of FIG. 4 above may comprise a processor (e.g., the processor 70) configured to perform each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200 to 230 may comprise, for example, the processor 70 and/or the interface processor 78, or an algorithm executed by the processor 70 for controlling the flow of information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving property information from a provider node, the property information being descriptive of at least one of in-device property and at least one remote property having interface support;
    providing the property information to a delivery context client interface based context model;
    enabling access, by a consumer application, to a property associated with the property information via the delivery context client interface based context model to enable provision of consumer data to the property to enable adaptive or customized services to the consumer application via the property;
    enabling definition of an additional extension with respect to a property associated with the context model; and
    generating an event notification to indicate that a new property has been added including an additional extension to standard interfaces of the context model.

2. The method of claim 1, wherein enabling definition of the additional extension comprises enabling provision of the additional extension for a corresponding additional property identified using a property identification field.

3. The method of claim 1, wherein enabling definition of the additional extension comprises providing a corresponding method identified by a method name, a parameter and an indication of a class of the parameter.

4. The method of claim 1, wherein, in response to a listener detecting the event notification, the method further comprises providing an active property added.

5. The method of claim 1, wherein, in response to a listener detecting the event notification, the method further comprises activating an available property added, but not previously activated.

6. A computer program product comprising at least one non-transitory computer-readable storage medium having computer-executable program code instructions stored therein, the computer-executable program code instruction comprising:
    program code instructions for receiving property information from a provider node, the property information being descriptive of at least one of in-device property and at least one remote property having interface support;
    program code instructions for providing the property information to a delivery context client interface based context model;
    program code instructions for enabling access, by a consumer application, to a property associated with the property information via the delivery context client interface based context model to enable provision of consumer data to the property to enable adaptive or customized services to the consumer application via the property;
    program code instructions for enabling definition of an additional extension with respect to a property associated with the context model; and
    program code instructions for generating an event notification to indicate that a new property has been added including an additional extension to standard interfaces of the context model.

7. The computer program product of claim 6, wherein the program code instructions for enabling definition of an additional extension include instructions for enabling provision of the additional extension for a corresponding additional property identified using a property identification field.

8. The computer program product of claim 6, wherein the program code instructions for enabling definition of an additional extension include instructions for providing a corresponding method identified by a method name, a parameter and an indication of a class of the parameter.

9. The computer program product of claim 6, further comprising program code instructions for, in response to a listener detecting the event notification, providing an active property added.

10. The computer program product of claim 6, further comprising program code instructions for, in response to a listener detecting the event notification, activating an available property added, but not previously activated.

11. An apparatus comprising a processor and memory including computer program code, the memory and computer program code configured to, with the processor, cause the apparatus to:
    receive property information from a provider node, the property information being descriptive of at least one of in-device property and at least one remote property having interface support;

provide the property information to a delivery context client interface based context model;

enable access, by a consumer application, to a property associated with the property information via the delivery context client interface based context model to enable provision of consumer data to the property to enable adaptive or customized services to the consumer application via the property;

enable definition of an additional extension with respect to a property associated with the context model; and generate an event notification to indicate that a new property has been added including an additional extension to standard interfaces of the context model.

12. The apparatus of claim 11, wherein the memory and computer program code are further configured to, with the processor, cause the apparatus to enable definition of the additional extension by enabling provision of the additional extension for a corresponding additional property identified using a property identification field.

13. The apparatus of claim 11, wherein the memory and computer program code are further configured to, with the processor, cause the apparatus to enable definition of the additional extension by providing a corresponding method identified by a method name, a parameter and an indication of a class of the parameter.

14. The apparatus of claim 11, wherein the memory and computer program code are further configured to, with the processor, cause the apparatus to, in response to a listener detecting the event notification, provide an active property added.

15. The apparatus of claim 11, wherein the memory and computer program code are further configured to, with the processor, cause the apparatus to, in response to a listener detecting the event notification, activate an available property added, but not previously activated.

16. An apparatus comprising:

a computer processor;

means for receiving property information from a provider node, the property information being descriptive of at least one of in-device property and at least one remote property having interface support;

means for providing the property information to a delivery context client interface based context model;

means for enabling access, by a consumer application, to a property associated with the property information via the delivery context client interface based context model to enable provision of consumer data to the property to enable adaptive or customized services to the consumer application via the property;

means for enabling definition of an additional extension with respect to a property associated with the context model; and means for generating an event notification to indicate that a new property has been added including an additional extension to standard interfaces of the context model.

* * * * *